United States Patent
Chamoun

(12) 
(10) Patent No.: US 10,894,702 B2
(45) Date of Patent: Jan. 19, 2021

(54) VEHICLE LIFT SYSTEM AND VEHICLE DOLLY SYSTEM

(71) Applicant: Teffy R. Chamoun, Sycamore, IL (US)

(72) Inventor: Teffy R. Chamoun, Sycamore, IL (US)

(*) Notice: Subject to any disclaimer, the term of this patent is extended or adjusted under 35 U.S.C. 154(b) by 297 days.

(21) Appl. No.: 15/625,536

(22) Filed: Jun. 16, 2017

(65) Prior Publication Data

US 2018/0362308 A1    Dec. 20, 2018

(51) Int. Cl.
| | |
|---|---|
| B66F 7/28 | (2006.01) |
| B66F 7/02 | (2006.01) |
| B60S 13/00 | (2006.01) |
| B62H 3/08 | (2006.01) |
| B62B 3/10 | (2006.01) |
| B62B 3/02 | (2006.01) |
| B62H 3/04 | (2006.01) |
| B62B 5/00 | (2006.01) |

(52) U.S. Cl.
CPC ............... *B66F 7/28* (2013.01); *B60S 13/00* (2013.01); *B62B 3/02* (2013.01); *B62B 3/10* (2013.01); *B62B 5/0093* (2013.01); *B62H 3/04* (2013.01); *B62H 3/08* (2013.01); *B66F 7/02* (2013.01); *B62B 2202/90* (2013.01); *B62B 2206/02* (2013.01); *B66F 2700/12* (2013.01); *B66F 2700/123* (2013.01)

(58) Field of Classification Search
CPC .... B66F 7/02; B66F 7/025; B66F 7/04; B66F 7/28; B66F 9/07; B66F 9/07504; B66F 9/00; B66F 9/06; B66F 2700/12; B66F 2700/123; B66F 5/00; B60S 13/00; B62B 2202/90

USPC ................................................ 269/17; 254/84
See application file for complete search history.

(56) References Cited

U.S. PATENT DOCUMENTS

| | | | | |
|---|---|---|---|---|
| 3,161,262 | A * | 12/1964 | Back ....................... | E21B 7/023 52/119 |
| 4,123,038 | A * | 10/1978 | Meyers ..................... | B66F 9/06 254/134 |
| 6,371,449 | B1 * | 4/2002 | Chamberlain ....... | B25H 1/0014 254/10 C |
| 9,055,738 | B1 * | 6/2015 | Woller ................. | A01M 31/006 |
| 2012/0090921 | A1 * | 4/2012 | Janz .......................... | B66D 1/60 187/216 |

FOREIGN PATENT DOCUMENTS

| | | | |
|---|---|---|---|
| DE | 102016123383 A1 * | 6/2018 | ................ B66F 7/02 |
| FR | 2733221 A1 * | 10/1996 | ................ B66F 9/02 |

* cited by examiner

*Primary Examiner* — Orlando E Aviles
*Assistant Examiner* — Aaron R McConnell
(74) *Attorney, Agent, or Firm* — Ice Miller LLP

(57) ABSTRACT

A vehicle lift system and vehicle dolly system are provided. The vehicle lift system includes a vertically extending portion, a stationary base portion extending horizontally from the vertically extending portion, a vertically movable vehicle support portion extending horizontally from the vertically extending portion and configured to support a vehicle dolly; and a lifting member coupled to the vehicle support portion and configured to elevate the vehicle support portion.

9 Claims, 10 Drawing Sheets

VEHICLE LIFT SYSTEM AND VEHICLE DOLLY SYSTEM

BACKGROUND OF THE DISCLOSED EMBODIMENTS

Motorcycle or other vehicle jacks or lifts are known in the art. These devices are used to elevate a motorcycle in order to, for example, perform repair or maintenance on the motorcycle, such as, engine repair, tire changing, and the like. A variety of lifting devices are known in the art. Many such lifting devices use a kickstand, centerstand, or other resting member to support the motorcycle during lifting, repair, and maintenance. However, supporting the motorcycle by a stand or rest may not be desirable if repair or maintenance is needed to the frame, stand, or other similar portion. Further, conventional motorcycle lifting devices accommodate only standard motorcycle wheelbases and/or wheel configurations. For example, a motorcycle having a raked front end or an extended rear swingarm resulting in a longer wheelbase, or a three-wheel vehicle, may not have sufficient support with a conventional lifting device due to the length and/or geometry of the conventional lifting device. It is preferable to store motorcycles and other vehicles properly and conveniently while not in use. Conventional dollies handle storage and movement, but only handle motorcycles and automobiles, and fail to interface with conventional lifting devices. As such, conventional dolly and lifting devices do not improve storage of motorcycles and various other vehicles. Finally, when the lifting device is not in use, it is preferable to be able to store the lifting device properly and conveniently. When a conventional lifting device is not in use, however, it occupies an unnecessarily large amount of space.

Therefore, there exists a need in the art for a vehicle lifting device cooperating with a vehicle dolly system that allows elevated storage of vehicles. Further, there exists a need in the art for a vehicle dolly system that is adaptable to support multiple vehicle wheel configurations and/or arrangements. Finally, there exists a need in the art for a vehicle lifting device configured to operate with a vehicle dolly system that is easily stored and occupies a minimal amount of space when not in use.

SUMMARY OF THE DISCLOSED EMBODIMENTS

In accordance with an embodiment of the present disclosure, a vehicle lift system is provided. The system includes a vertically extending portion, a stationary base portion extending horizontally from the vertically extending portion, a vertically movable vehicle support portion extending horizontally from the vertically extending portion and configured to support a vehicle dolly, and a lifting member coupled to the vehicle support portion and configured to elevate the vehicle support portion.

In accordance with an embodiment of the present disclosure, a vehicle dolly system is provided. The system includes a longitudinally extending main portion configured to support at least one vehicle movement member and having a vehicle dolly first lateral side, a vehicle dolly second lateral side, a vehicle dolly first longitudinal end, and a vehicle dolly second longitudinal end, at least one wheel disposed at the vehicle dolly first longitudinal end and configured to support the longitudinally extending main portion, and at least one wheel disposed at the vehicle dolly second longitudinal end and configured to support the longitudinally extending main portion, wherein the longitudinally extending main portion is adjustable to accommodate varying vehicle configurations.

BRIEF DESCRIPTION OF THE DRAWINGS

The embodiments and other features, advantages, and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
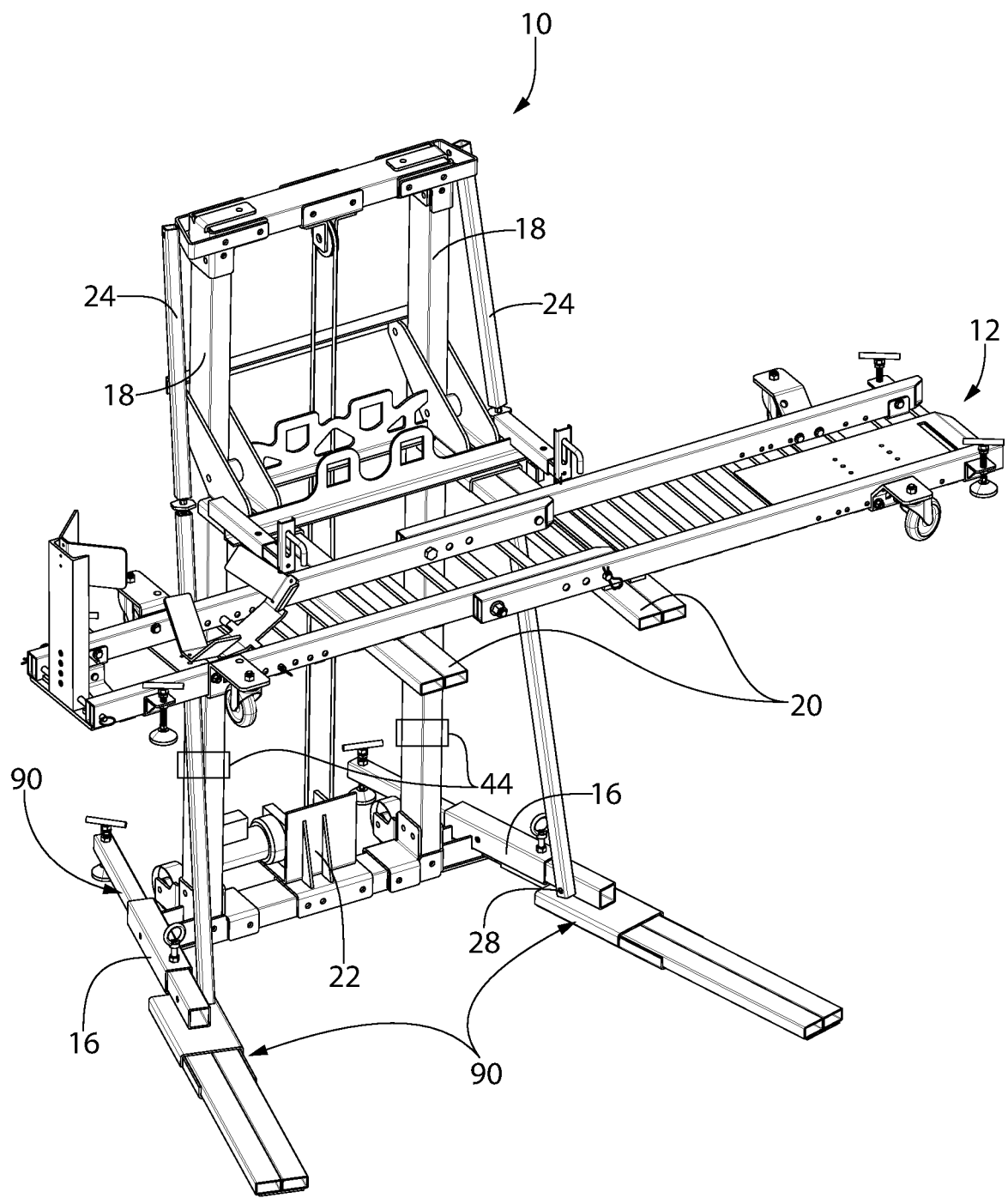
FIG. 1 illustrates a vehicle lift and dolly system in accordance with an embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Referring now to FIG. 1, a vehicle lift system 10 with a vehicle dolly 12 is illustrated. The vehicle dolly 12 is referred to both as a vehicle dolly and as a vehicle dolly system without limiting the embodiments of each described or illustrated herein. The vehicle lift system 10 includes a vertically extending portion 18, a stationary base portion 16 extending horizontally from the vertically extending portion 18, and a vertically movable vehicle support portion 20 extending horizontally from the vertically extending portion 18 and configured to support the vehicle dolly 12. As will be understood by the Figures, the vertically extending portion 18, the stationary base portion 16, and/or the vehicle support portion 20 may include a single or multiple portions (such as two co-planar or parallel portions, as illustrated in one or more of the Figures).

The vehicle lift system 10 of the embodiment illustrated in FIG. 1 includes a lifting member 22 coupled to the vehicle support portion 20. The lifting member 22 is configured to elevate the vehicle support portion 20. The lifting member 22 is an electric hoist in an embodiment. In additional embodiments, the lifting member 22 is a mechanically, hydraulically, pneumatically, and/or electrically powered component. Further, the vehicle lift system 10 may include various structures known in the art to raise the vehicle support portion 20, such as a jack, scissor mechanism, screw drive, and/or pulley(s), to name specific non-limiting examples. One having ordinary skill in the art will recognize the various combinations of structures and means for lifting to raise vehicles and other objects, and such structures and means for lifting form part of the present disclosure. The lift system 10 of the embodiment illustrated in FIGS. 1 and 2 further includes an adjustable stop member 44 configured to couple to the vertically extending portion 18 and the vehicle support portion 20 and limit downward movement of the vehicle support portion 20.

Figure 2:
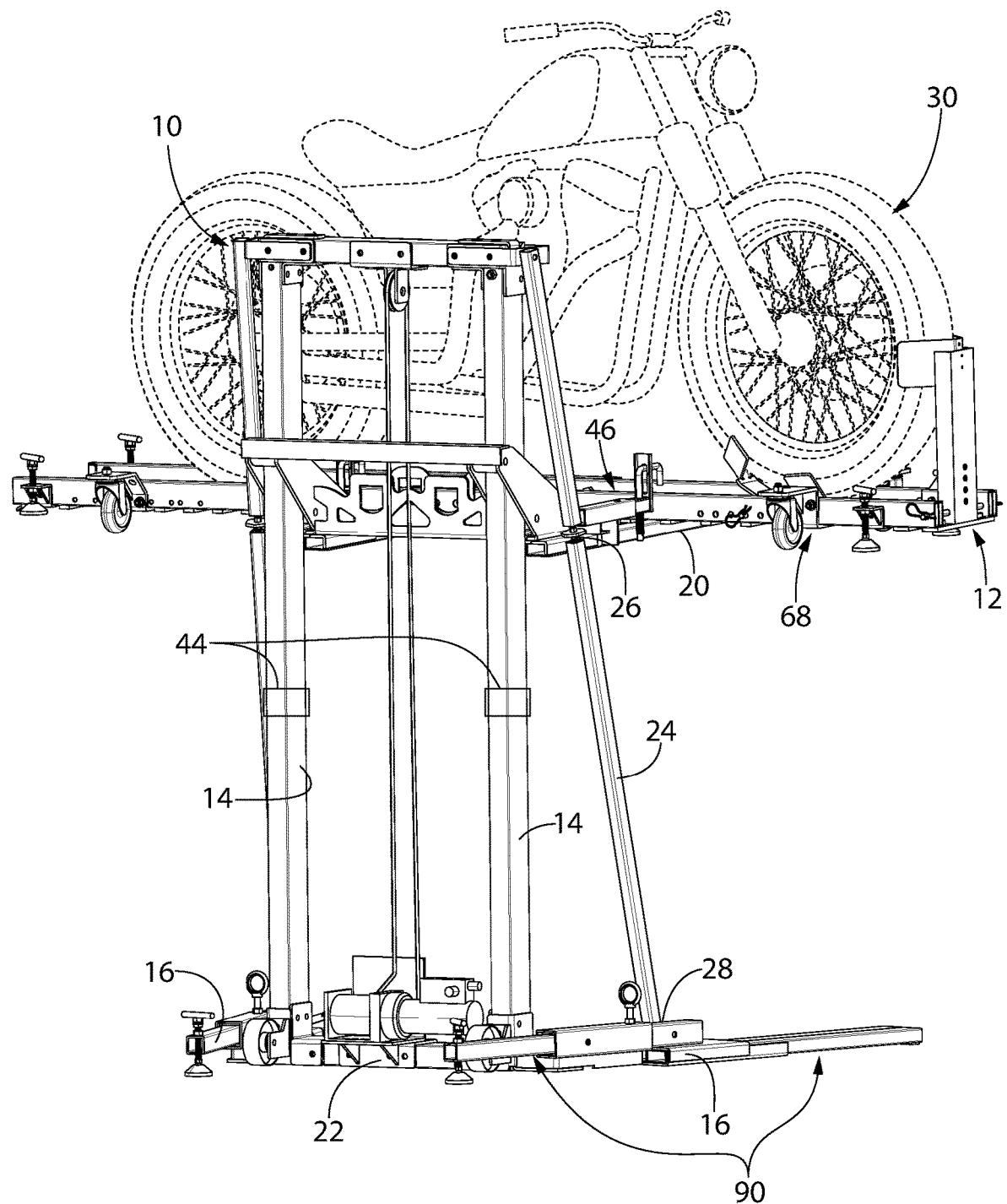
FIG. 2 illustrates a vehicle lift and dolly system in accordance with an embodiment of the present disclosure.

The system 10 of the embodiment illustrated in FIG. 1 further includes one or more brace portion(s) 24 extending between the vertically extending portion 18 and the base portion 16. Referring to FIG. 2, the brace portion(s) 24 include a brace portion adjustment member 26 configured to adjust a length of the brace portion(s) 24. The brace portion(s) 24 of the illustrated embodiment extends diagonally to a forward location 28 of the base portion 16. In an additional embodiment not illustrated, the brace portion(s) 24 extends diagonally or vertically to another location of the base portion 16, such as a rear location of the base portion to name a non-limiting example. As illustrated in FIG. 1, the base portion 16 includes one or more base adjustment portions 90, as will be described in further detail below. The base portion 16 is adjustable at the base adjustment portions 90 in order to allow the base portion 16 to increase and decrease in size based on use and/or preference of the lift system 10.

Figure 7:
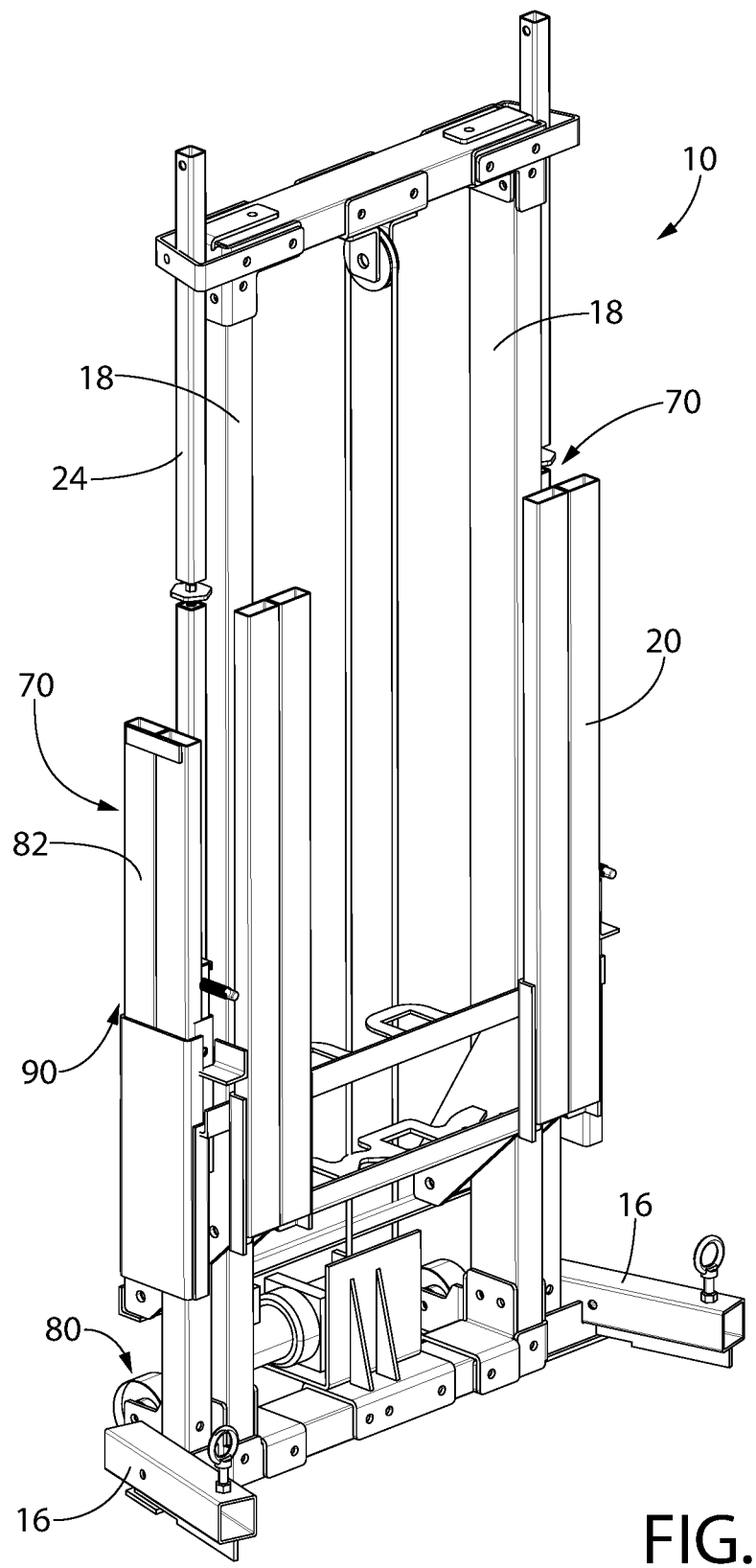
FIG. 7 illustrates a vehicle lift system in accordance with an embodiment of the present disclosure.

Referring now to FIG. 7, the brace portion(s) 24 of an embodiment is/are movable or removable to align with the vertically extending portion 18, such as to collapse or otherwise move to a configuration for storage or non-use. As similarly illustrated in FIG. 7, at least a portion of the stationary base portion 16, including one or more base adjustment portions 90, is/are moveable and/or removable to align with the vertically extending portion 18, such as to collapse or otherwise move to a configuration for storage or non-use. In the illustrated embodiment, a forward base portion member 82 is moveable to align with the vertically extending portion 18. As illustrated, the forward base portion member 82 may include plural forward base portion members 82 on each side of the base portion 16. In the illustrated embodiment, the brace portion(s) 24 and the forward base portion member(s) 82 are removable and repositioned at storage locations 70 along the vertically extending portion 18. The storage locations 70 may include a cavity into which the brace portion(s) 24 and the forward base portion member 82 may be inserted, or may include any other fixing or attachment structure or means known by a person having ordinary skill in the art. In additional embodiments not illustrated, the brace portion(s) 24 and/or the base portion 16 components are pivotable to the storage locations 70 along the vertically extending portion 18 or are collapsible or foldable. As illustrated in FIG. 7, the vehicle support portion 20 is pivotable to move to a configuration for storage or non-use. In additional embodiments, the vehicle support portion 20 is collapsible, detachable, or capable of being moved to a configuration for storage or non-use according to another operation. As illustrated in FIGS. 1, 2, and 7, one or more lift wheels 80 are coupled to the base portion 16 to allow movement of the lift system 10 in an embodiment.

Figure 3:
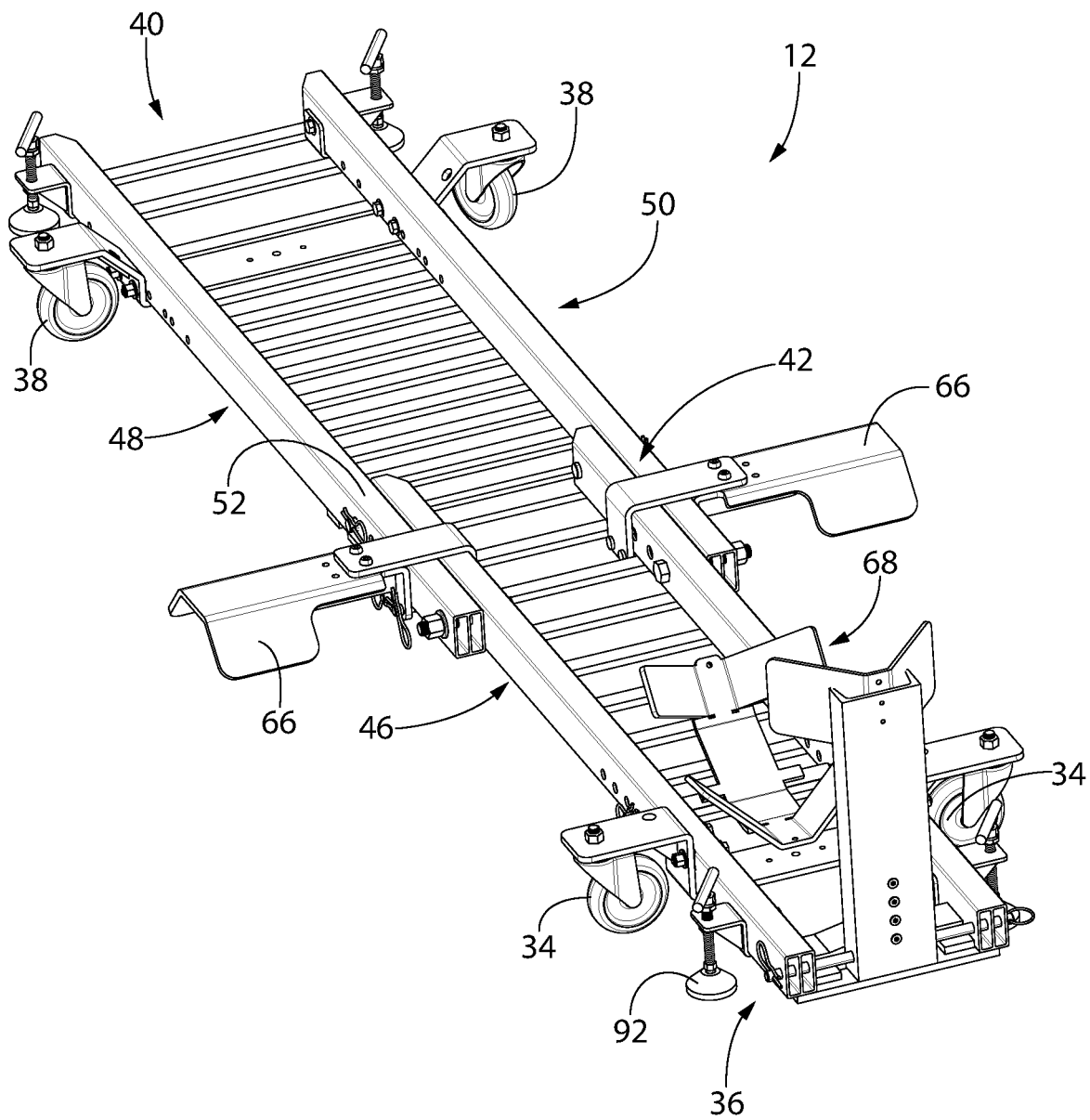
FIG. 3 illustrates a vehicle dolly system in accordance with an embodiment of the present disclosure.

In accordance with one embodiment and illustrated in further detail in FIG. 3, the vehicle dolly 12 forms part of the lift system 10. The vehicle dolly 12 is capable of operating independently of the lift system 10 in additional embodiments. The vehicle dolly 12 improves maneuverability of a vehicle, such as a motorcycle, a three-wheeled vehicle, or another vehicle having atypical geometries or structures. The vehicle dolly 12, for example, improves the ability to move the vehicle into a corner, along a wall, and/or into a narrow area, especially for storage or transportation of the vehicle. For a vehicle to interface with the lift system 10, the vehicle may need to be moved such that its side is located near the lift system 10. The vehicle dolly 12 improves maneuverability of the vehicle. As described herein, cooperation between the dolly 12 and the lift system 10, through the attachment and other mechanisms between the dolly 12 and the lift system 10, is safer and easier to use than conventional dolly and/or lift systems.

The vehicle dolly 12 is configured to support one or more vehicle movement member(s) 30, as illustrated in FIG. 2. The vehicle movement member(s) 30 includes one or more vehicle wheels, skis, tracks, and/or another lower portion of a vehicle engaging or at least contacting the ground and/or enabling or controlling movement of the vehicle. In particular embodiments, the vehicle is a motorcycle, a bicycle, three-wheeled motorcycle with a single front wheel, a three-wheeled motorcycle with a single rear wheel, a motorcycle with a sidecar, a snowmobile, a golf cart, a go-cart, a utility task vehicle (UTV), a lawnmower, a tractor, a car, a truck, and/or any other vehicle.

As shown in FIGS. 2 and 3, the vehicle dolly 12 includes a longitudinally extending main portion 46 configured to support the vehicle movement member(s) 30. The dolly 12 further includes a vehicle dolly first lateral side 48, a vehicle dolly second lateral side 50, a vehicle dolly first longitudinal end 36, and a vehicle dolly second longitudinal end 40. The vehicle dolly 12 includes at least one wheel 34 at the vehicle dolly first longitudinal end 36 and at least one wheel 38 at the vehicle dolly second longitudinal end 40. In additional embodiments, the dolly 12 includes at least one wheel 34 centrally located at the main portion 46 instead of or in addition to the at least one wheel 34, 38 disposed at one or both of the vehicle dolly longitudinal ends 36, 40. The embodiment illustrated in FIG. 3 includes two wheels 34 at the vehicle dolly first longitudinal end 36 and two wheels 38 at the vehicle dolly second longitudinal end 40. Referring again to FIG. 1 with continuing reference to FIGS. 2 and 3, the vehicle support portion 20 is configured to support the vehicle dolly 12 at a central vehicle dolly portion 42 between the at least one wheel 34 at the vehicle dolly first longitudinal end 36 and the at least one wheel 38 at the vehicle dolly second longitudinal end 40. In additional embodiments not illustrated, the vehicle support portion 20 is configured to support the vehicle dolly 12 at a location different from the central vehicle dolly portion 42.

Figure 4:
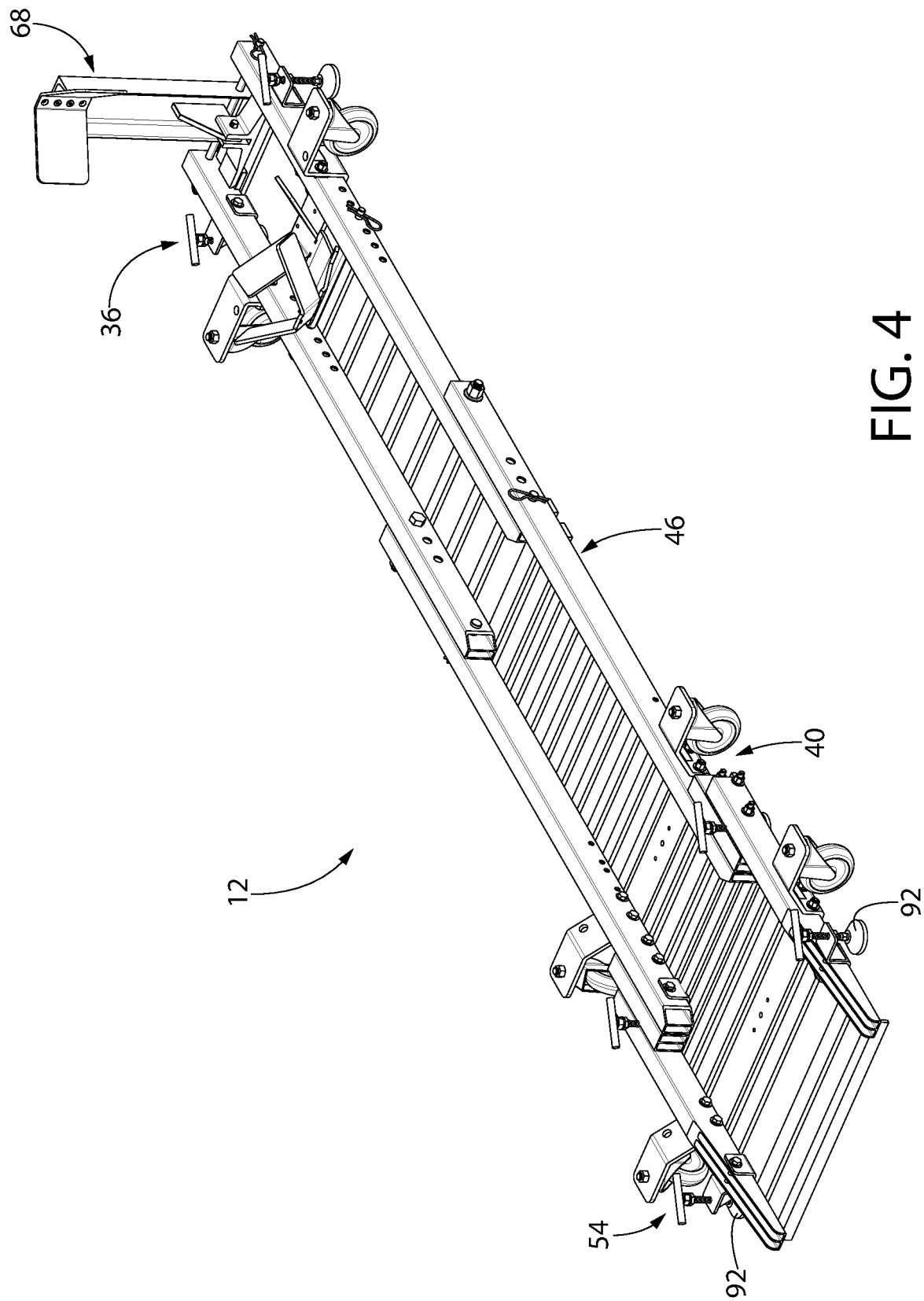
FIG. 4 illustrates a vehicle dolly system in accordance with an embodiment of the present disclosure.
Figure 5:
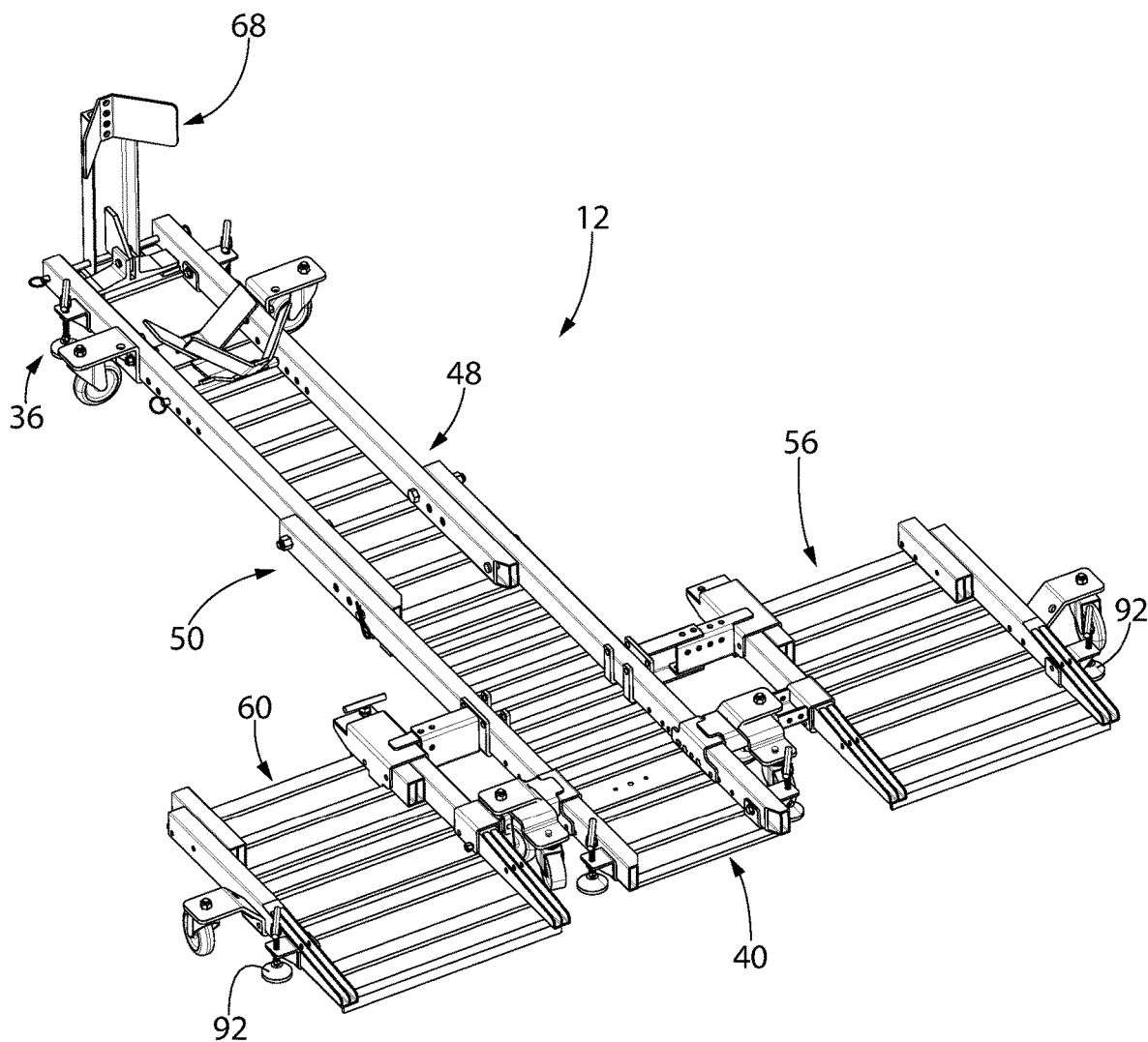
FIG. 5 illustrates a vehicle dolly system in accordance with an embodiment of the present disclosure.

As illustrated in FIGS. 3-5, one or more dolly feet 92 are positioned at one or more locations of the dolly 12 to immobilize the dolly 12 or otherwise secure the dolly 12 from movement. The dolly feet 92 may be adjustable, such as by being rotatably extended downward via helical screw mechanism, for selective engagement with a floor surface in an embodiment. In additional embodiments not illustrated, other structures or means for fixing, immobilizing or otherwise securing the dolly 12 are included with the dolly 12.

The dolly 12 of the embodiment illustrated in FIG. 3 further includes one or more support bracket(s) 66 disposed at the vehicle dolly first lateral side 48 and the vehicle dolly second lateral side 50. The support bracket(s) 66 provide a surface on which a user may step while loading or unloading a vehicle, such as a motorcycle, onto the dolly 12. The support bracket(s) 66 further provides a surface that a user may push against while unloading a vehicle, such as a motorcycle, from the dolly 12. The support bracket(s) 66 may be detachable or collapsible in one or more embodiments, and are disposed at the central vehicle dolly portion 42 in an embodiment.

The dolly 12 of the embodiment illustrated in FIG. 3 further includes a wheel locking member 68 disposed at the vehicle dolly first longitudinal end 36. The wheel locking member 68 includes any feature described and/or illustrated in U.S. Pat. No. 6,648,300 and/or U.S. Reissued Pat. No. RE42,971, both of which are incorporated in their entireties herein by reference. In additional embodiments, the wheel locking member 68 includes any wheel chalk or forward stop structure or method known by one of ordinary skill in the art. In additional embodiments, the wheel locking member 68 may be positioned at the vehicle dolly second longitudinal end 40.

The main portion 46 is adjustable in an embodiment to accommodate varying vehicle configurations. For example, in FIG. 3, a central dolly adjustment portion 52 is shown that is longitudinally expandable to increase the length of the dolly 12 to accommodate, in a non-limiting example, vehicles having different wheelbase lengths or longitudinal separation distances between vehicle movement member(s) 30. In additional embodiments not illustrated, two main portions 46 combine to form a single dolly 12 that may accommodate a four-wheeled vehicle, such as a tractor, lawnmower, go-cart, golf-cart, utility task vehicle (UTV), all-terrain vehicle (ATV), car, or truck. The two main portions 46 may be used in a coupled or uncoupled configuration, and may include one or more components of any embodiment described or illustrated herein.

Additionally, as illustrated in FIG. 4, an embodiment includes an extension portion 54 coupled to the vehicle dolly first longitudinal end 36 and/or the vehicle dolly second longitudinal end 40 of the main portion 46 and extending longitudinally therefrom. Illustrated in further detail in FIG. 6, a ramp member 64 may be coupled to the vehicle dolly first longitudinal end 36 and/or the vehicle dolly second longitudinal end 40 of the main portion 46 and extend longitudinally therefrom. FIG. 5 illustrates a further embodiment of the dolly 12 having a first vehicle movement member support portion 56 disposed at the vehicle dolly first lateral side 48 and configured to support a first vehicle movement member 30 and a second vehicle movement member support portion 60 disposed at the vehicle dolly second lateral side 50 and configured to support a second vehicle movement member 30. As shown in FIG. 5, the first vehicle movement member support portion 56 and/or the second vehicle movement member support portion 60 includes at least one wheel 62 configured to support the first vehicle movement member support portion 56 and/or the second vehicle movement member support portion 60. In an additional embodiment not shown, the dolly 12 includes a single vehicle movement member support portion on either the vehicle dolly first lateral side 48 or the vehicle dolly second lateral side 50 in order to support at least one vehicle movement member, such as coupled to a motorcycle being supported by the main portion 46 in one non-limiting example.

Figure 6:
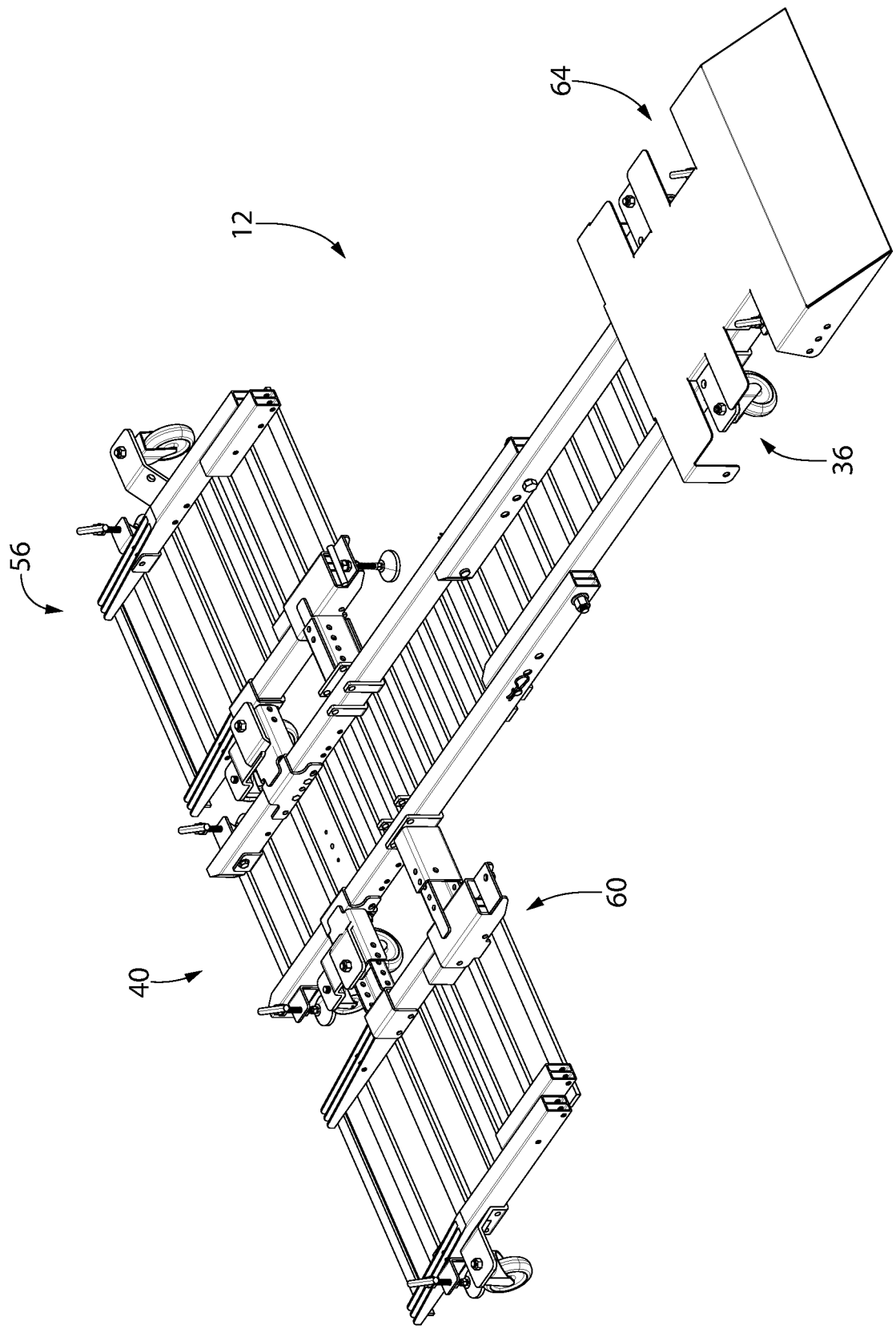
FIG. 6 illustrates a vehicle dolly system in accordance with an embodiment of the present disclosure.

The embodiment of FIG. 5 illustrates a dolly 12 configured to support a three-wheeled motorcycle (not shown) having a single front wheel. As shown in FIG. 6, another embodiment of the dolly 12 is configured to support a three-wheeled motorcycle (not shown) having a single rear wheel. As illustrated in FIG. 6, the ramp member 64 allows loading, unloading, and/or support of the single rear wheel described above. In any embodiment of the dolly 12 described or illustrated herein, the ramp member 64 may be utilized at the vehicle dolly first longitudinal end 36 and/or the vehicle dolly second longitudinal end 40.

In an additional embodiment not illustrated, the dolly 12 includes removable or retractable tow wheels at the vehicle dolly first longitudinal end 36 and/or the vehicle dolly second longitudinal end 40 of any embodiment described or illustrated herein. In an additional embodiment not illustrated, the dolly 12 includes removable or retractable tow wheels at the vehicle dolly first lateral side 48 and/or the vehicle dolly second lateral side 50 of any embodiment described or illustrated herein, such as at a central location and/or another portion of the dolly 12. In the non-illustrated embodiment, the dolly 12 further includes a tow attachment member configured to couple the dolly 12 to another vehicle for towing of the dolly 12. The removable or retractable tow wheels are sized and positioned to allow the dolly 12 to be towed by another vehicle. In an embodiment not illustrated, the tow wheels are pivotally coupled to the dolly 12 such that, upon the downward pivoting of the tow wheels, the dolly 12 is at least partially supported on the tow wheels. In an embodiment not illustrated, the tow wheels are pivotally coupled to the dolly 12 such that, upon forward movement of the coupled tow vehicle, the dolly 12 is at least partially supported on the tow wheels. In another embodiment not illustrated, the tow wheels are detachable such that, upon attachment of the tow wheels to the dolly 12, the dolly 12 is at least partially supported on the tow wheels.

Figure 8:
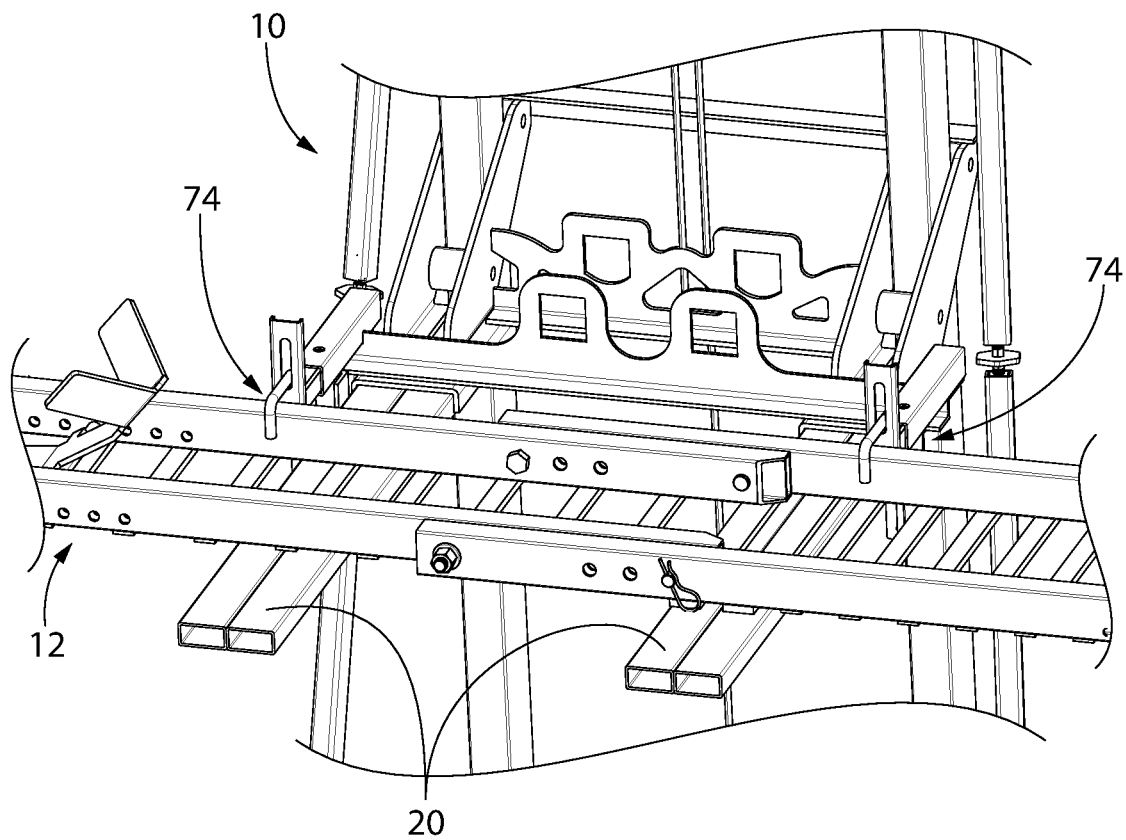
FIG. 8 illustrates a vehicle lift system and vehicle dolly system in accordance with an embodiment of the present disclosure.
Figure 9:
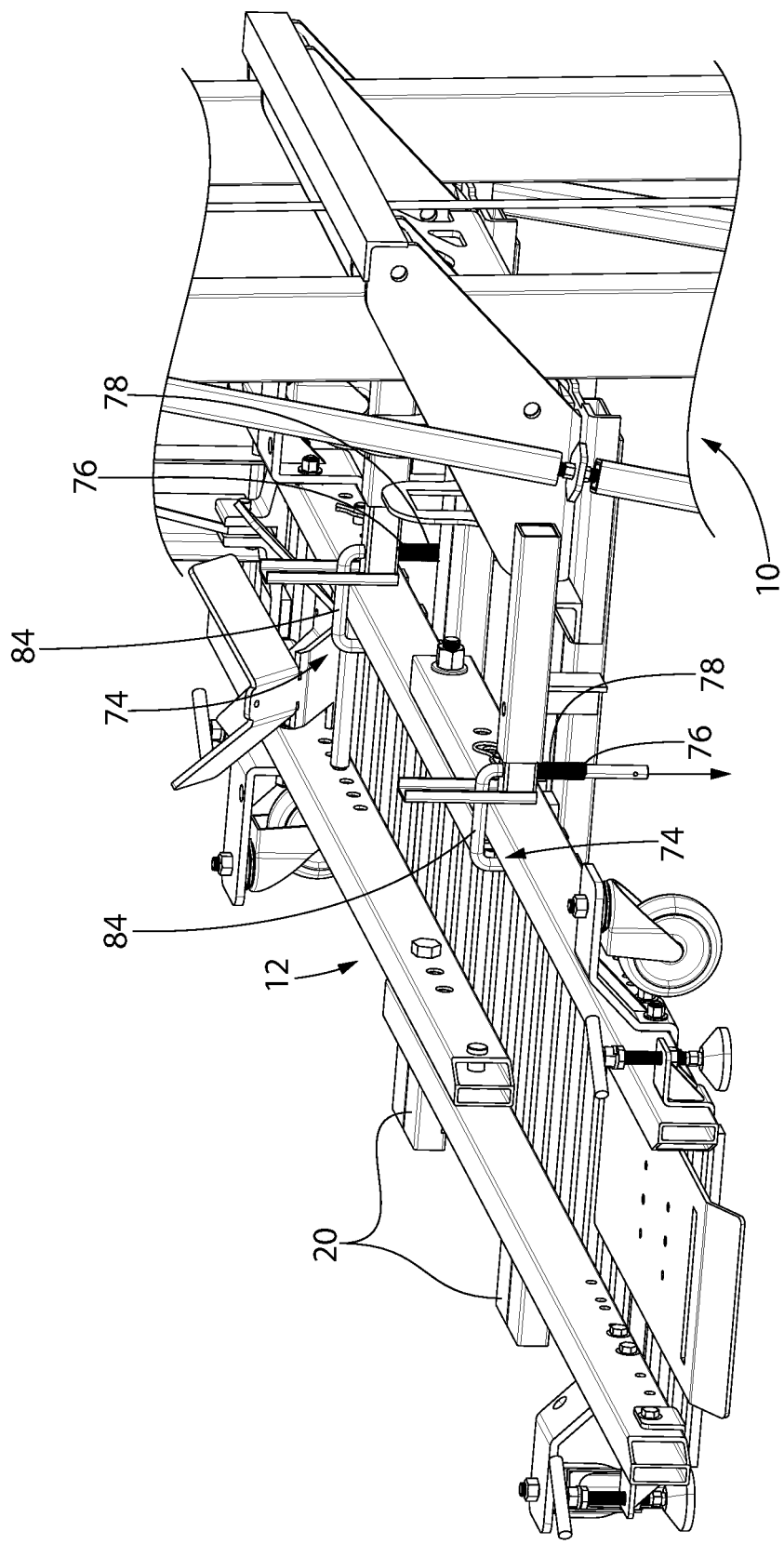
FIG. 9 illustrates a vehicle lift system and vehicle dolly system in accordance with an embodiment of the present disclosure.
Figure 10:
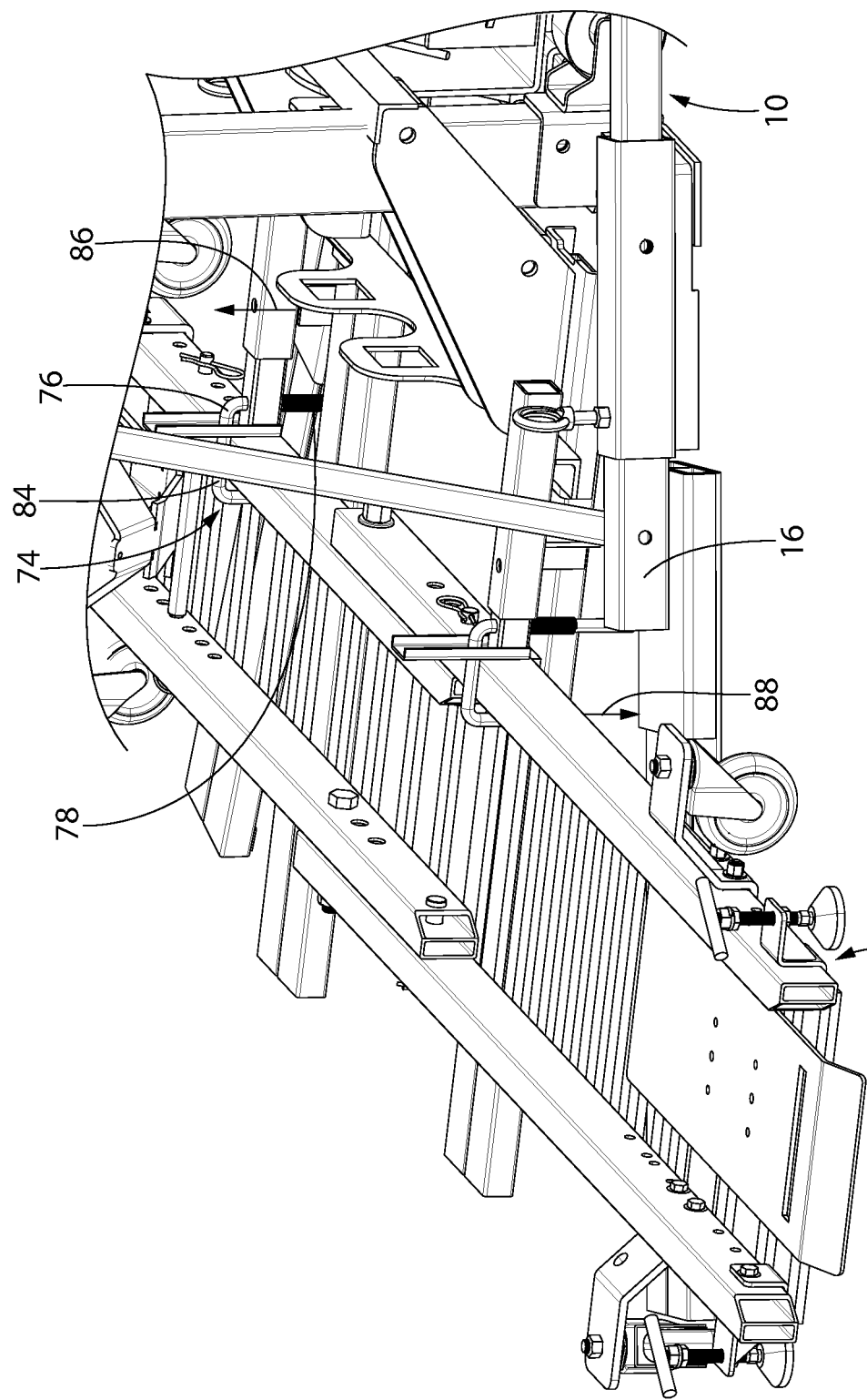
FIG. 10 illustrates a vehicle lift system and vehicle dolly system in accordance with an embodiment of the present disclosure.

Referring now to FIGS. 8-10, the lift system 10 and/or the dolly 12 includes one or more locking member(s) 74 configured to releasably secure the vehicle dolly 12 upon upward vertical movement of the vehicle support portion 20. FIGS. 8 and 9 illustrate the dolly 12 in an elevated position on the vehicle lift system 10 with the locking members 74 securing the vehicle dolly 12 to the vehicle support portion 20. As illustrated in FIG. 9, the locking members 74 include a vertically-extending shaft 76 with a spring 78 coupled thereto and an upper hook portion 84 configured to extent over and/or around a portion of the vehicle dolly 12. Referring now to FIG. 10, the locking member(s) 74 is/are configured to move vertically upward, as indicated by arrow 86, upon downward vertical movement, as indicated by arrow 88, of the vehicle support portion 20. Specifically, the locking member(s) 74 moves upward upon contact of the shaft 76 with the surface upon which the base portion 16 is disposed and/or upon contact with a portion of the base portion 16 itself. The spring 78 provides a biasing force to urge the locking member(s) 74 back into engagement with the dolly 12 upon upward movement of the vehicle support portion 20 and vehicle dolly 12. The shaft 76, the upper hook portion 84, and/or another portion of the locking member(s) 74 are sized to allow movement of the vehicle dolly 12 onto the vehicle support portion 20 and/or into alignment with the locking member(s) 74 and/or sized to move the locking member(s) 74 into and out of engagement with the dolly 12 upon movement of the vehicle support portion 20 and/or contact of the shaft 76 or another portion of the locking member(s) 74 with the surface upon which the base portion 16 is disposed and/or upon contact with a portion of base portion 16. In an embodiment, the locking member(s) 74 is/are configured to move vertically upward after the dolly 12 contacts the base portion 16, the floor surface upon which the stationary base portion 16 is positioned, and/or another predetermined surface. In one or more of such embodiments, the dolly 12 is secured on the floor or other stable surface before the locking member(s) 74 release the dolly 12. In additional embodiments, the locking member(s) 74 partially or completely release the dolly 12 before the dolly 12 contacts or is secured upon the floor or other stable surface. The locking member(s) 74 of one or more embodiments not illustrated includes any other mechanism capable of securing the vehicle dolly 12 to the vehicle support portion 20 and/or another portion or component of the lift system 10. In one or more non-illustrated embodiments, the vehicle dolly 12 engages a pivoting, rotatable, deformable, slidable, and/or otherwise movable mechanism, such as, in one non-limiting example, the wheel locking member 68 or any forward stop structure or method known by one of ordinary skill in the art that engages the vehicle dolly 12 and/or any portion thereof.

The lift system 10 raises the vehicle support portion 20 between 0 and 6 feet in an embodiment, between 0 and 5 feet in an embodiment, and between 0 and 4 feet in an embodiment. In additional embodiments, the lift system 10 raises the vehicle support portion 20 from 0 to a height less than 4 feet. In one or more embodiments, the lift system 10 allows the storage of another vehicle under the vehicle support portion 20 when the vehicle support portion 20 is raised. The storage of the second vehicle may optionally be in cooperation with use of another vehicle dolly or vehicle dolly system. Therefore, multiple vehicles may be stored and/or subject to repair or maintenance with the vehicle dolly 12 and vehicle lift system 10.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A vehicle lift system, comprising:
    a vertically extending portion;
    a stationary base portion extending horizontally from the vertically extending portion;
    a vertically movable vehicle support portion extending horizontally from the vertically extending portion and configured to support a vehicle dolly;
    a lifting member coupled to the vehicle support portion and configured to elevate the vehicle support portion;
    at least one brace portion extending between the vertically extending portion and the base portion; and
    at least one locking member configured to releasably secure the vehicle dolly to the vehicle support portion upon upward movement of the vehicle support portion, wherein each of the at least one locking member comprises a vertically-extending shaft and a spring coupled to the vertically-extending shaft.

2. The system of claim 1, wherein the at least one locking member is configured to move vertically upward upon downward vertical movement of the vehicle support portion.

3. The system of claim 2, wherein the at least one locking member is configured to move vertically upward after the dolly contacts a floor surface upon which the stationary base portion is positioned.

4. The system of claim 1, wherein the vehicle dolly includes at least one wheel at a vehicle dolly first longitudinal end and at least one wheel at a vehicle dolly second longitudinal end.

5. The system of claim 4, wherein the vehicle support portion is configured to support the vehicle dolly at a central vehicle dolly portion between the at least one wheel at the vehicle dolly first longitudinal end and the at least one wheel at the vehicle dolly second longitudinal end.

6. The system of claim 1, further comprising an adjustable stop configured to couple to at least one of the vertically extending portion and the vehicle support portion and configured to limit downward movement of the vehicle support portion.

7. The system of claim 1, wherein the at least one brace portion is movable to align with the vertically extending portion.

8. The system of claim 1, wherein at least a portion of the stationary base portion is moveable to align with the vertically extending portion.

9. The system of claim 1, further comprising a vehicle dolly configured to support at least one vehicle movement member.

* * * * *